Sept. 10, 1963 W. H. RICHARDS 3,103,028
ADJUSTABLE IMPLEMENT HANDLE ASSEMBLY
Filed Nov. 30, 1962
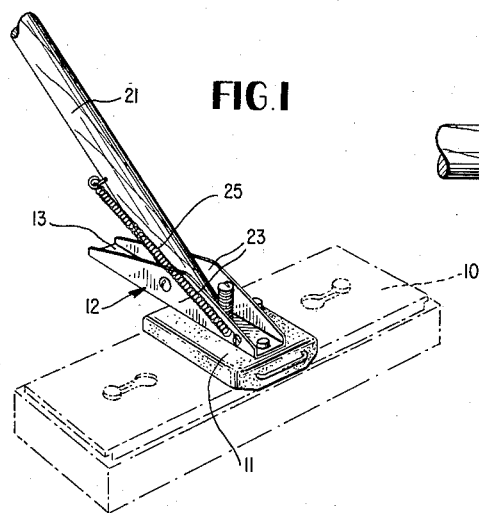
FIG.1
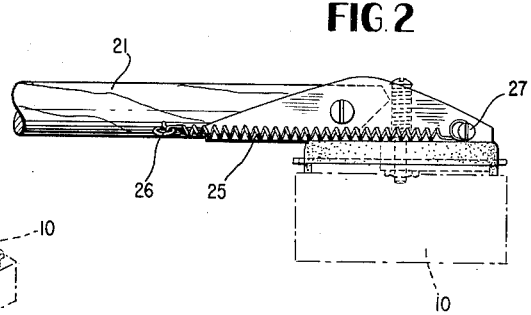
FIG.2
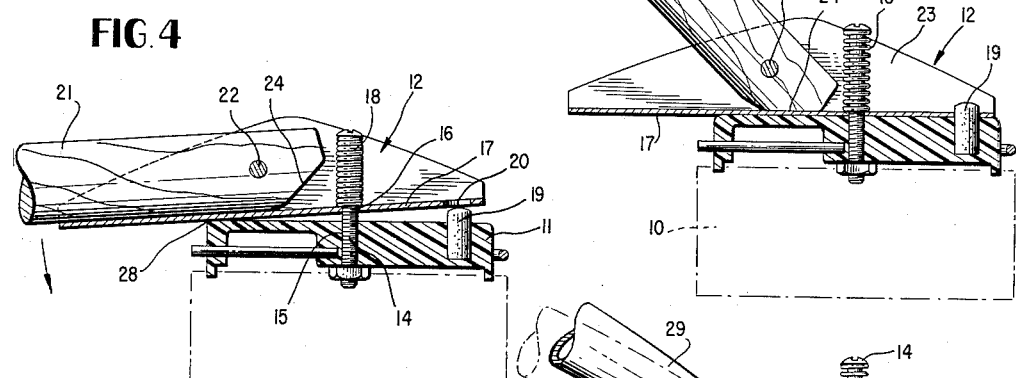
FIG.4    FIG.3
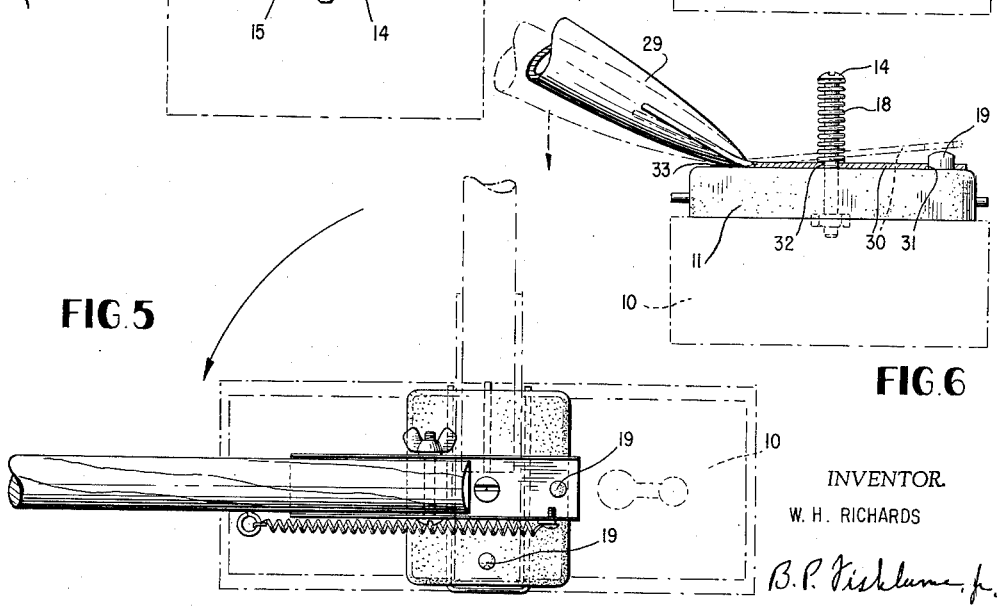
FIG.5    FIG.6
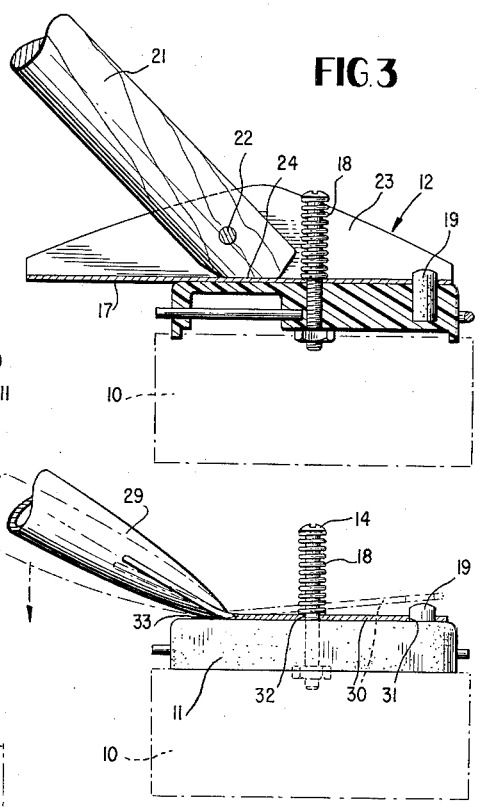
INVENTOR.
W. H. RICHARDS
ATTORNEY

United States Patent Office 3,103,028
Patented Sept. 10, 1963

3,103,028
ADJUSTABLE IMPLEMENT HANDLE ASSEMBLY
William Henry Richards, 1610 W. 14th St.,
Wilmington, Del.
Filed Nov. 30, 1962, Ser. No. 241,250
1 Claim. (Cl. 15—118)

This invention relates to an adjustable, combined scraper and handle for cleaning implements or other manually operated implements.

The combined scraper and handle means of the invention is ideally suited for modern-day block sponge mops but may also be used on other types of mops, brushes or even hand tools outside of the cleaning type.

An object is to provide an adjustable implement handle assembly including a handle adapter member which lends strength to the assembly and also serves as a scraper.

A more general object is to provide means of the mentioned character which is highly simplified and compact, very economical to manufacture, rugged and durable, and convenient and efficient to use.

Other objects and advantages of the invention will be apparent during the course of the following description.

In the accompanying drawings forming a part of this application and in which like numerals are employed to designate like parts throughout the same, FIGURE 1 is a perspective view of adjustable handle means according to the invention and showing one adjusted position thereof, FIGURE 2 is a side elevation of the same with the handle in a lowermost position, FIGURE 3 is an enlarged central vertical sectional view through the invention as shown in FIGURE 1, FIGURE 4 is a view similar to FIGURE 3 and illustrating the rocking movement of the handle prior to turning the handle in a horizontal plane relative to the implement head, FIGURE 5 is a plan view of the invention further illustrating the adjustment of the handle relative to the implement head in a horizontal plane, whereby the handle may extend either longitudinally or transversely of the head, and FIGURE 6 is a cross sectional view showing a modification of the invention.

In the drawings wherein for the purpose of illustration are shown preferred embodiments of the invention, attention is directed first to FIGURES 1 through 5, wherein the numeral 10 designates an implement head such as a block sponge mop head of the unitary or foldable type. The implement head 10 could be a different type of mop head, a brush head, or for that matter any type of hand-operated implement head found desirable.

The invention proper comprises a generally rectangular relatively small mounting plate 11 formed of plastics material or any other suitable material and attached to the implement head 10 in any preferred manner. Mounted upon the mounting plate 11 is a narrow elongated preferably metal channel-like adapter member 12 having a trailing edge 13 adapted to serve as a floor scraper or the like. The adapter member 12 is considerably narrower than the mounting plate 11 and considerably longer than the latter, as shown in the drawings.

An upstanding bolt 14 or the like suitably anchored within a central opening 15 of the mounting plate 11 extends through an opening 16 in the bottom wall 17 of adapter member 12 and considerably above the bottom wall and carries a compressible coil spring 18 which constantly urges the adapter member 12 downwardly toward engagement with the mounting plate 11, as shown.

The mounting plate has a pair of short upstanding lock pins or lugs 19 rigid therewith and projecting above its top face and spaced apart 90 degrees on an arc centered upon the vertical axis of the pivot bolt 14. The adapter member 12 is provided in its bottom wall 17 near its leading end with an aperture 20 engageable with either of the two lock pins 19 to facilitate locking the handle assembly in either of two positions at right angles to or longitudinally of the implement head as best shown in FIGURE 5.

An implement handle 21 formed of wood or the like is pivoted near its lower end by a transverse bolt 22, rivet or the like, between the side flanges 23 of adapter member 12, somewhat rearwardly of the bolt 14. The pivot elements 14 and 22 are at right angles to each other as shown. The leading end of handle 21 is beveled at 24 upon preferably a 45 degree angle to the axis of the handle so that the handle may be readily swung to an elevated position, FIGURE 3, 45 degrees above the implement head upon the axis of the pivot element 22. In such position, the beveled face 24 positively contacts the bottom wall 17 of adapter member 12 to stabilize the handle in the raised position thereof. The handle may be lowered to a horizontal position relative to the implement head 10, FIGURE 2, in which position the handle rests directly upon the bottom wall 17 and between the side flanges 23 of the channel-shaped adapter member.

The handle 21 is releasably held in both the raised and lowered positions shown in FIGURES 2 and 3 by an off-center retractile coil spring 25 having one end thereof anchored at 26 to the handle and its other end anchored at 27 to one side flange 23 of the adapter member near the forward end thereof. The spring 25 lies close to the handle and adapter member 12 and is substantially out of the way and conveniently located at one side of the assembly. This spring is eccentrically mounted with respect to the handle pivot element 22 and swings upon opposite sides of dead center relative to the pivot element 22, so as to resiliently lock the handle 21 in either the raised or lowered position as should now be obvious.

In order to turn the handle and adapter member 12 90 degrees upon the mounting plate 11, it is merely necessary to lower the handle, FIGURE 4, and rock the handle and adapter member 12 rearwardly upon one edge 28 of the mounting plate 11 and this will elevate the forward aperture 20 from the adjacent lug 19 and allow turning of the assembly upon the axis of pivot element 14. Upon downward rocking of the assembly, after turning, FIGURE 5, the spring 18 causes the aperture 20 to engage over the second of the spaced lugs 19. The spring 18 is quite stiff and firmly holds the handle assembly in either of the two angularly adjusted positions at right angles to or longitudinally of the implement head 10 as shown in FIGURE 5.

FIGURE 6 shows a slight modification and a simplification of the adjustable handle means, wherein the adapter member 12 is entirely omitted along with the two-position vertical adjustment of the handle upon the pivot element 22.

Instead of this arrangement, the handle 29, which may be a metal handle, has a flattened leading extension 30, or foot, set at a convenient angle to the handle and adapted to rest directly upon the top of mounting plate 11. The foot 30 has a forward aperture 31 to receive either of the aforementioned lugs 19 and the foot has a rearward opening 32 receiving the aforementioned bolt 14 pivotally. The spring 18 is employed as in the first form of the invention to press the foot 30 against the top of mounting plate 11.

When it is desired to swing the handle 29 90 degrees upon the axis of the element 14, the handle is first depressed as shown in broken lines in FIGURE 6 and the foot 30 rocks at 33 upon the heel thereof and the spring 18 yields and allows separation of the fixed lug 19 from the aperture 31 of the handle foot. The handle is now turned 90 degrees and re-engaged under influence of the spring 18 with the second lug 19, not shown in FIGURE 6 but corresponding exactly to the arrangement shown in FIGURES 1 and 5.

It is to be understood that the forms of the invention herewith shown and described are to be taken as preferred examples of the same, and that various changes in the shape, size and arrangement of parts may be resorted to, without departing from the spirit of the invention and scope of the subjoined claim.

Having thus decribed my invention, I claim:

In a mop, a mounting plate attachable to mop head plate means and having a substantially flat top face and being substantially rectangular and having marginal edges arranged substantially at right angles to each other and adapted to serve as fulcrums, an elongated relatively narrow channel-shaped adapter member including upstanding sides and a flat bottom wall, said bottom wall engageable with said flat face of said mounting plate, said adapter member being materially longer than said rectangular adapter plate and extending longitudinally beyond said marginal edges in all angularly adjusted positions of the adapter member relative to the mounting plate, an upstanding pivot element interconnecting the adapter member and mounting plate centrally of the mounting plate and intermediate the ends of the adapter member and allowing the adapter member to turn relative to the mounting plate in the plane of said flat top face, a compression spring mounted upon said pivot element above the bottom wall of the adapter member and bearing downwardly on said bottom wall to normally maintain the same in contact with the flat top face of said mounting plate, said elongated adapter member being rockable bodily upon a selected one of said marginal edges serving as a fulcrum to allow elevation of the forward end of the adapter member above said flat top face, the bottom wall of the adapter member having a locking opening near the forward end of said member and forwardly of said pivot element, at least a pair of upstanding locking lugs on the mounting plate adjacent marginal edges thereof spaced apart substantially ninety degrees circumferentially of the axis of said pivot element and spaced equidistantly radially of said axis and selectively engageable within said opening of the adapter member upon rocking and turning of the latter upon the mounting plate to releasably secure the adapter member in selected angularly adjusted positions relative to the mounting plate, the rear end portion of the adapter member extending beyond the adajcent marginal edge of the mounting plate in any angularly adjusted locked position of the adapter member so as to provide a scraping extension on said mop, a mop handle having its lower end portion disposed between the upstanding sides of the adapter member, a second pivot element interconnecting said handle and upstanding sides so that the handle may swing vertically relative to the adapter member, the lower end of the handle being beveled at an acute angle to the axis of the handle and the beveled end of the handle engageable with said flat bottom wall to limit swinging movement of the handle upwardly relative to the adapter member, one side of the handle engageable with said bottom wall when the handle is substantially parallel thereto to limit downward swinging movement of the handle, and a retractile coil spring interconecting the handle and the adapter member on opposite sides of the second pivot element and eccentric to the second pivot element to thereby releasably hold the vertically swingable handle in the extreme raised or lowered positions relative to the adapter member.

References Cited in the file of this patent
UNITED STATES PATENTS

| | | |
|---|---|---|
| 395,960 | Drew | Jan. 8, 1889 |
| 727,035 | VanLoan | May 5, 1903 |
| 1,771,325 | Cotter | July 22, 1930 |
| 1,989,825 | Shaefer et al. | Feb. 5, 1935 |
| 1,994,677 | Wildhaber | Mar. 19, 1935 |
| 2,893,035 | Weaver et al. | July 7, 1959 |
| 2,967,317 | Richards | Jan. 10, 1961 |